(12) United States Patent
Nagai et al.

(10) Patent No.: US 10,622,873 B2
(45) Date of Patent: Apr. 14, 2020

(54) LAMINATED ROTOR AND METHOD FOR BALANCING THE SAME

(71) Applicants: Mitsui High-tec, Inc., Kitakyushu-shi, Fukuoka (JP); TOYOTA JIDOSHA KABUSHIKI KAISHA, Toyota-shi, Aichi-ken (JP)

(72) Inventors: Akira Nagai, Kitakyushu (JP); Kenji Katsuki, Kitakyushu (JP); Go Kato, Kitakyushu (JP); Jin Oda, Kitakyushu (JP); Yuzo Ohta, Kitakyushu (JP); Masashi Matsumoto, Toyota (JP); Tatsuhiko Mizutani, Toyota (JP)

(73) Assignees: MITSUI HIGH-TEC, INC., Kitakyushu-shi (JP); TOYOTA JIDOSHA KABUSHIKI KAISHA, Toyota-shi (JP)

(*) Notice: Subject to any disclaimer, the term of this patent is extended or adjusted under 35 U.S.C. 154(b) by 267 days.

(21) Appl. No.: 14/794,046

(22) Filed: Jul. 8, 2015

(65) Prior Publication Data
US 2016/0013709 A1  Jan. 14, 2016

(30) Foreign Application Priority Data
Jul. 9, 2014  (JP) .................................. 2014-141531

(51) Int. Cl.
*H02K 15/03* (2006.01)
*H02K 1/27* (2006.01)
*H02K 15/16* (2006.01)

(52) U.S. Cl.
CPC ........... *H02K 15/165* (2013.01); *H02K 1/276* (2013.01); *H02K 15/03* (2013.01)

(58) Field of Classification Search
CPC ........ H02K 15/16; H02K 15/165; H02K 1/27; H02K 1/276; H02K 1/2713; H02K 1/272;
(Continued)

(56) References Cited

U.S. PATENT DOCUMENTS

| 5,508,576 A * | 4/1996 | Nagate ................... C08L 23/02 |
| | | 310/156.54 |
| 2009/0174273 A1* | 7/2009 | Watanabe .............. H02K 15/03 |
| | | 310/156.53 |

(Continued)

FOREIGN PATENT DOCUMENTS

| JP | 9-294358 A | 11/1997 |
| JP | 11-089138 A | 3/1999 |

(Continued)

OTHER PUBLICATIONS

Ishimatsu Kenji; Maki Kiyohisa; Nagai Akira, Resin Sealing Method for Laminated Iron Core Rotor, Jan. 17, 2008, Mitsui High Tech Inc., JP 2008-011646 (English Machine Translation).*

(Continued)

*Primary Examiner* — Alfonso Perez Borroto
*Assistant Examiner* — Alexander A Singh
(74) *Attorney, Agent, or Firm* — Westerman, Hattori, Daniels & Adrian, LLP (57) ABSTRACT

In the case of a laminated rotor core 10, insertion of permanent magnets 14 and filling of resin 15 into each of magnet insertion holes 13 are performed in order to cancel out a problem of an imbalanced weight estimated from a deviation of lamination thickness in a circumferential direction of a laminated core body 12, and a manufacturing method includes a step of measuring a deviation of lamination thickness in which an imbalanced weight is estimated by measuring the deviation of lamination thickness in the circumferential direction of the laminated core body 12, and a step of balance adjustment in which the insertion of the permanent magnets 14 into each of the magnet insertion holes 13 and the filling of resin 15 into each of the magnet insertion holes 13 are performed in a manner that cancels out a problem of this imbalanced weight.

9 Claims, 7 Drawing Sheets

(58) Field of Classification Search
CPC .... H02K 1/2726; H02K 1/2733; H02K 1/274; H02K 1/2746; H02K 1/2753; H02K 1/2766; H02K 1/2773; H02K 1/278; H02K 15/03; H02K 1/28
USPC .......................... 310/156.08, 156.64; 29/598
See application file for complete search history.

(56) References Cited

U.S. PATENT DOCUMENTS

| | | |
|---|---|---|
| 2012/0104892 A1 | 5/2012 | Kamei |
| 2012/0222289 A1* | 9/2012 | Nagai ..................... H02K 1/276 29/598 |
| 2013/0038163 A1* | 2/2013 | Kim ....................... H02K 1/276 310/156.16 |

FOREIGN PATENT DOCUMENTS

| | | | | |
|---|---|---|---|---|
| JP | 2007-124819 A | | | 5/2007 |
| JP | 2008011646 A | * | | 1/2008 |
| JP | 2012-100428 A | | | 5/2012 |
| JP | 2012-100499 A | | | 5/2012 |
| JP | 2013-021829 A | | | 1/2013 |

OTHER PUBLICATIONS

Office Action dated Nov. 29, 2016, issued in counterpart Japanese Patent Application No. 2014-141531, with English translation. (6 pages).

\* cited by examiner

PRIOR ART

FIG. 5(B)

PRIOR ART

FIG. 6(A)

PRIOR ART

FIG. 6(B)

PRIOR ART

FIG. 7

PRIOR ART

_US 10,622,873 B2_

LAMINATED ROTOR AND METHOD FOR BALANCING THE SAME

TECHNICAL FIELD

The present invention relates to a laminated rotor core formed by laminating a plurality of iron core pieces and to a method for manufacturing the above laminated rotor core.

BACKGROUND ART

Figure 5A:
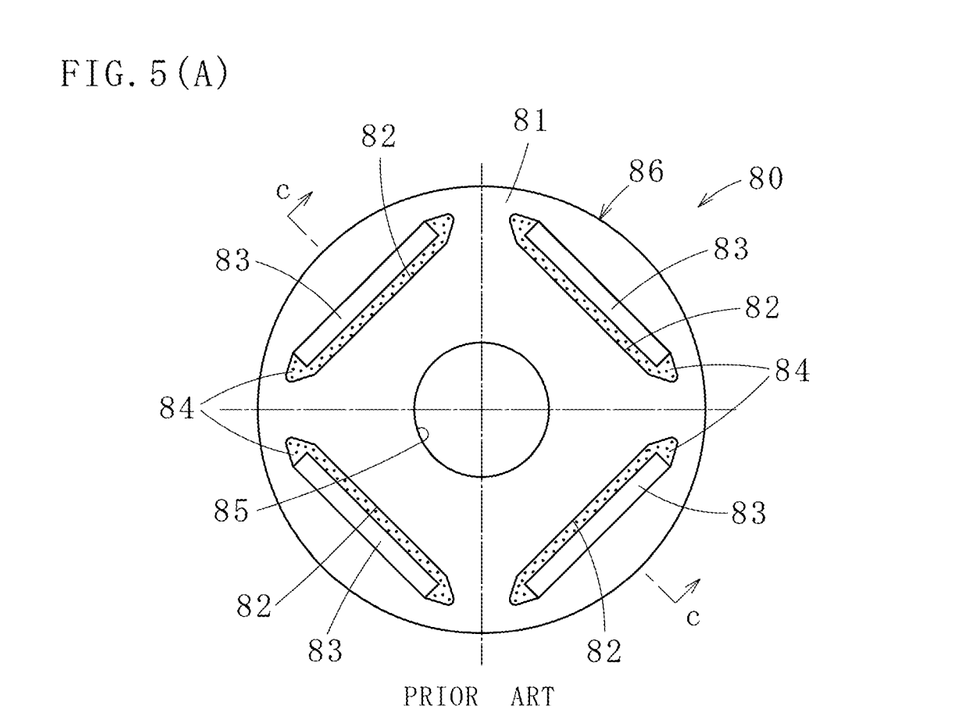
FIG. 5(A) is a plan view of a laminated rotor core according to a conventional example.
Figure 5B:
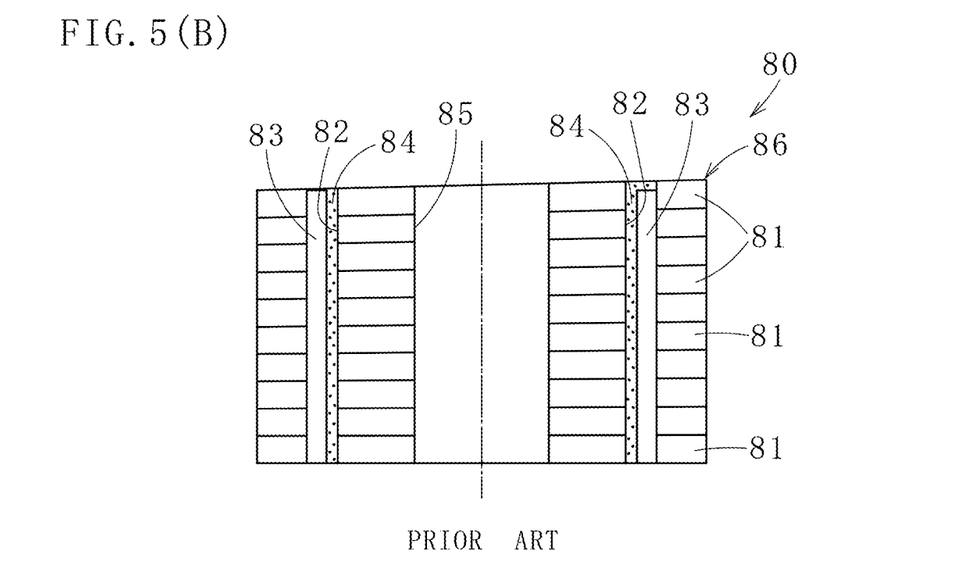
FIG. 5(B) is a cross-sectional view of FIG. 5(A) from an arrow c to another arrow c.

Manufacturing of a laminated rotor core (hereinafter also simply referred to as the laminated core) 80 illustrated in FIGS. 5(A) and 5(B) is performed mainly by three steps including 1) laminating a plurality of iron core pieces 81 punched out from a steel sheet, 2) inserting permanent magnets 83 into provided magnet insertion holes 82, and 3) fixing the permanent magnets 83 by injecting resin 84 into the magnet insertion holes 82. In FIGS. 5(A) and 5(B), a numeral 85 represents a shaft hole, and a numeral 86 represents a laminated core body which is formed by laminating the plurality of the iron core pieces 81.

Normally, in any laminated rotor core, there exists an imbalance of weight in a circumferential direction of the laminated rotor cores, and due to an influence of the weight imbalance, lowering of performance of a motor such as inconsistency of motor torque is incurred. Accordingly, with respect to a largely imbalanced phase, an end face plate to be provided to an end in a shaft direction of each laminated rotor core is spot-faced to correct the weight imbalance.

However, an amount of correction achieved by spot-facing is limited, and this method cannot be applied to laminated rotor cores for which end face plates are not used. In each of the above-described main steps 1) to 3), there are factors causing the imbalance described below.

Figure 6A:
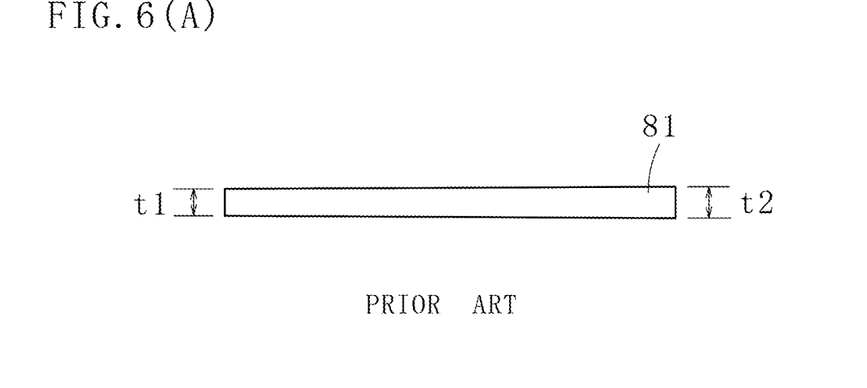
FIG. 6(A) is a side view of one of iron core pieces each having a deviation of sheet thickness.
Figure 6B:
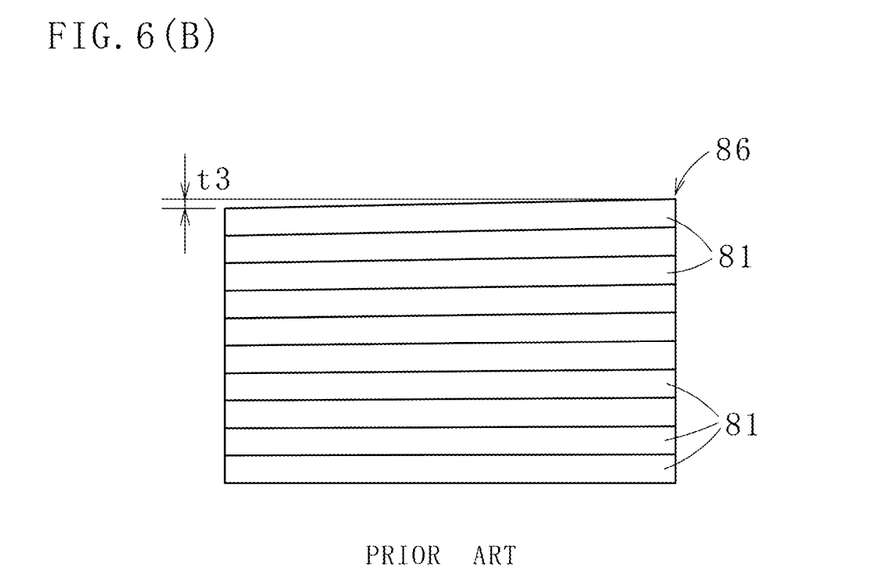
FIG. 6(B) is a side view of a laminated core body formed by rotationally laminating the same iron core pieces.

With regard to the step 1): Due to an influence from the time of rolling, a deviation of sheet thickness exists in a steel sheet, and a deviation of sheet thickness (t2-t1) also develops in each of the punched out iron core pieces 81 illustrated in FIG. 6(A). Accordingly, since the iron core pieces 81 are laminated in a rotational manner at the time of manufacturing a laminated core in order to resolve a problem of deviation of lamination thickness in the laminated core (hereinafter also referred to as the deviation of lamination thickness) caused by the influence of the deviation of sheet thickness, a deviation of lamination thickness t3 illustrated in FIG. 6(B) is alleviated. However, it is impossible to get rid of the deviation of laminated thickness t3 completely, and a weight balance becomes disproportionate.

With regard to the step 2): Since weights of the permanent magnets are unequal, a weight balance becomes disproportionate due to the difference in weight of the permanent magnets to be inserted in each of the magnet insertion holes.

With respect to step 3): Since the magnet insertion holes are bigger than the permanent magnets, the permanent magnets having been inserted lean to one side or become tilted in the magnet insertion holes, and positions and postures of the permanent magnets are irregular. When resin is injected into the magnet insertion holes in this state, a flow of the resin becomes affected by the positions and the postures of the permanent magnets and becomes unsteady, the positions and the postures in which the permanent magnets become fixed also become irregular, and the weight balance becomes disproportionate.

Among the above three particulars, with regard to the disproportion of weight balance incurred in the steps 1) and 2), as described in, for example, Patent Literatures 1 and 2, there is a correction method by which a weight is measured in a circumferential direction of a laminated core body (an iron core, a rotor body), weights of a plurality of permanent magnets are measured, or permanent magnets are processed and controlled so as to make the weight of each of the permanent magnets different, and the permanent magnets are fixed in the laminated core body in such positions that an imbalanced weight in the laminated core body is canceled out.

CITATION LIST

Patent Literature

Patent Literature 1: Japanese Unexamined Patent Application Publication No. 09-294358
Patent Literature 2: Japanese Unexamined Patent Application Publication No. 2013-021829

SUMMARY OF INVENTION

Technical Problem

However, in the case of the above correction method, an additional step must be employed in order to measure the imbalance of weight, and there is a problem in that production efficiency lowers and a cost increases.

In the case of an IPM motor (Interior Permanent Magnet Motor), with a method by which permanent magnets are fixed using resin, as described above, there is also a problem in that fixed positions and postures of the permanent magnets become irregular. For this reason, depending on an arrangement condition of the permanent magnets, there is a possibility that the corrected imbalance would go back into a bad condition in the step 3) described earlier.

Figure 7:
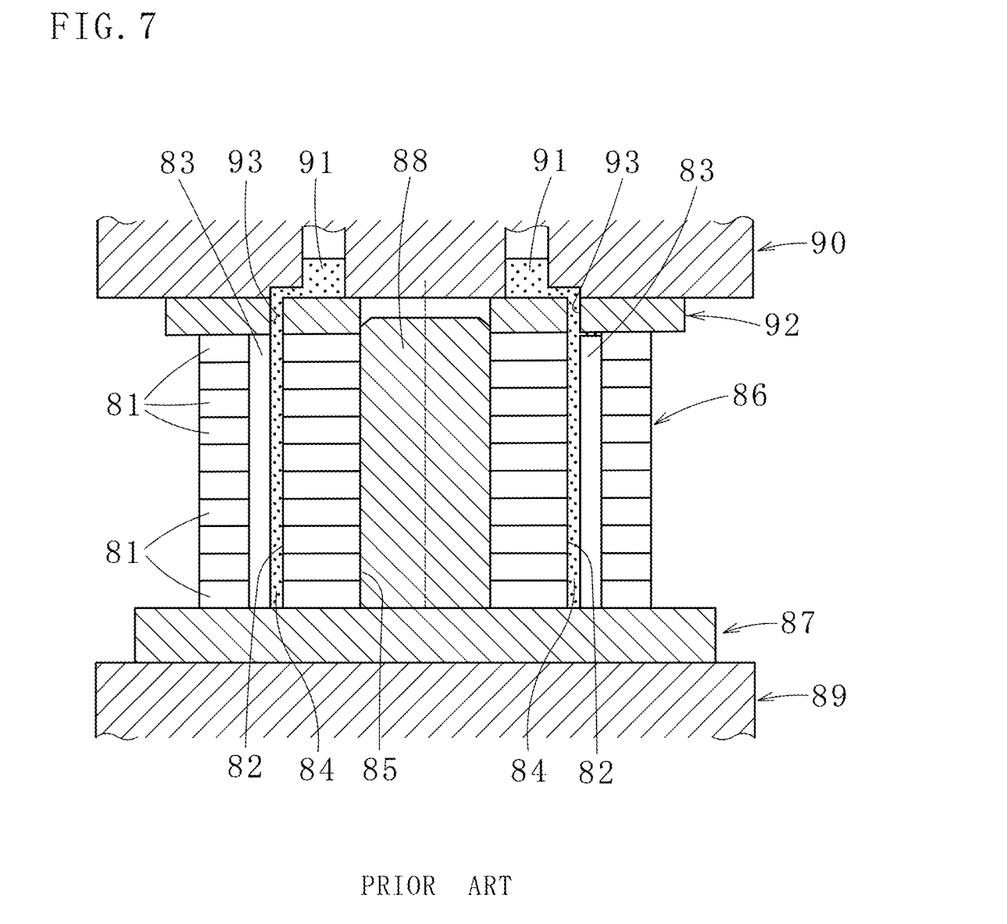
FIG. 7 is an explanatory diagram showing a condition at the time of injecting resin into a laminated core body.

Additionally, in the step 3), as illustrated in FIG. 7, resin is injected after placing a laminated core body 86 on a conveyor jig 87. For positioning, a pillar 88 provided to the conveyor jig 87 is inserted in a shaft hole 85. In this regard, since the laminated core body 86 models on the conveyor jig 87 (the pillar 88) and a shape of the laminated core body 86 becomes corrected, the imbalance of weight shifts. Thus, even if a correction was made based on the measured imbalance prior to inserting the pillar 88 in the shaft hole 85, there is a possibility that the correction would not exert enough effect. In FIG. 7, numerals 89, 90, 91, 92, and 93 represent a lower die, an upper die, resin reservoir pots, a cull plate, and resin injection holes, respectively.

The present invention has been made in view of the above circumstances, and an object thereof is to provide a laminated rotor core capable of obtaining a good motor characteristic effectively and economically and also to provide a manufacturing method of the above laminated rotor core.

Solution to Problem

In order to achieve the above object, according to a first aspect of the present invention, there is provided a laminated rotor core including a laminated core body formed by laminating a plurality of iron core pieces, and a plurality of magnet insertion holes having permanent magnets inserted inside and resin-sealed, the magnet insertion holes being formed in a circumferential direction centering on a shaft center of the laminated core body, the laminated rotor core further including performing (A) insertion of the permanent magnets into each of the magnet insertion holes and/or (B) filling of resin into each of the magnet insertion holes in order to cancel out an imbalanced weight in the circumferential direction of the laminated core body that is estimated from a deviation of lamination thickness in the circumferential direction of the laminated core body.

In the case of the laminated rotor core according to the first aspect of the present invention, provided that the (A) is going to be performed, it is preferred that (a) the permanent magnets of different weights be selectively inserted in each of the magnet insertion holes and/or (b) arrangement positions of the permanent magnets inside each of the magnet insertion holes be adjusted.

In the case of the laminated rotor core according to the first aspect of the present invention, provided that the (B) is going to be performed, it is preferred that an amount of resin to be filled into each of the magnet insertion holes be adjusted.

In order to achieve the above object, according to a second aspect of the present invention, there is provided a method for manufacturing a laminated rotor core including composing a laminated core body by laminating a plurality of iron core pieces, inserting permanent magnets in a plurality of magnet insertion holes formed in a circumferential direction centering on a shaft center of the laminated core body and injecting resin into the magnet insertion holes, and curing the resin having been filled into the magnet insertion holes, the method for manufacturing a laminated rotor core further including a step of measuring a deviation of lamination thickness in which a deviation of lamination thickness in the circumferential direction of the laminated core body is measured and an imbalanced weight in the circumferential direction of the laminated core body is estimated from the measured value, and a step of balance adjustment in which (A) insertion of the permanent magnets into each of the magnet insertion holes and/or (B) filling of resin into each of the magnet insertion holes are performed in a manner that cancels out the imbalanced weight estimated.

In the case of the method for manufacturing a laminated rotor core according to the second aspect of the present invention, provided that the (A) is going to be performed in the step of balance adjustment, it is preferred that (a) the weights of the plurality of the permanent magnets be measured and the permanent magnets of different weights be selectively inserted in each of the magnet insertion holes, and/or (b) arrangement positions of the permanent magnets inside each of the magnet insertion holes be adjusted.

In the case of the method for manufacturing a laminated rotor core according to the second aspect of the present invention, provided that the (a) is going to be performed, it is desirable that the plurality of the permanent magnets having their weights measured be prepared in the number used for manufacturing the single laminated rotor core.

In the case of the method for manufacturing a laminated rotor core according to the second aspect of the present invention, provided that the (B) is going to be performed in the step of balance adjustment, it is preferred that an amount of resin to be filled into each of the magnet insertion holes be adjusted.

In the case of the method for manufacturing a laminated rotor core according to the second aspect of the present invention, it is preferred that the measurement of the deviation of lamination thickness in the step of measuring a deviation of lamination thickness be performed after placing the laminated core body on a conveyor jig, and that the permanent magnets be inserted in each of the magnet insertion holes and resin be injected and cured while the laminated core body is in a state of being placed on the conveyor jig.

Advantageous Effects of Invention

In the laminated rotor core and the method for manufacturing the laminated rotor core according to the present invention, since the imbalanced weight in the circumferential direction of the laminated core body is estimated from the deviation of lamination thickness in the circumferential direction of the laminated core body, unlike conventional ways, there is no need to provide a new step for measuring an imbalanced weight. Measurements of deviations of lamination thicknesses are commonly performed, for example, in the manufacturing of laminated rotor cores. Therefore, by inserting permanent magnets into each of magnet insertion holes and filling resin into each of the magnet insertion holes using an imbalanced weight estimated based on a deviation of lamination thickness, a laminated rotor core capable of effectively and economically obtaining a good motor characteristic can be manufactured and provided.

Especially, in the case of measuring a deviation of lamination thickness after placing a laminated core body on the conveyor jig, since the deviation of lamination thickness is measured after the shape of the laminated core body is corrected by the conveyor jig, the imbalanced weight can be modified more accurately than ever.

BRIEF DESCRIPTION OF DRAWINGS

FIG. 1(B) is a cross-sectional view of FIG. 1(A) from an arrow a to another arrow a.

DESCRIPTION OF EMBODIMENTS

Next, with reference to the accompanying drawings, descriptions will be given on embodiments of the present invention for a better understanding of the present invention.

Figure 1A:
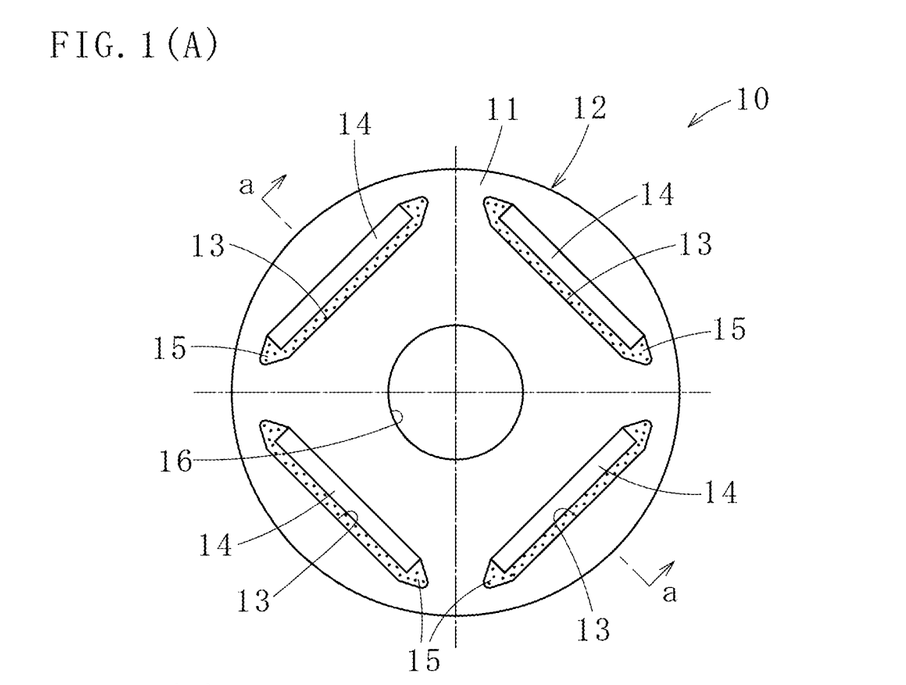
FIG. 1(A) is a plan view of a laminated rotor core according to one embodiment of the present invention.
Figure 1B:
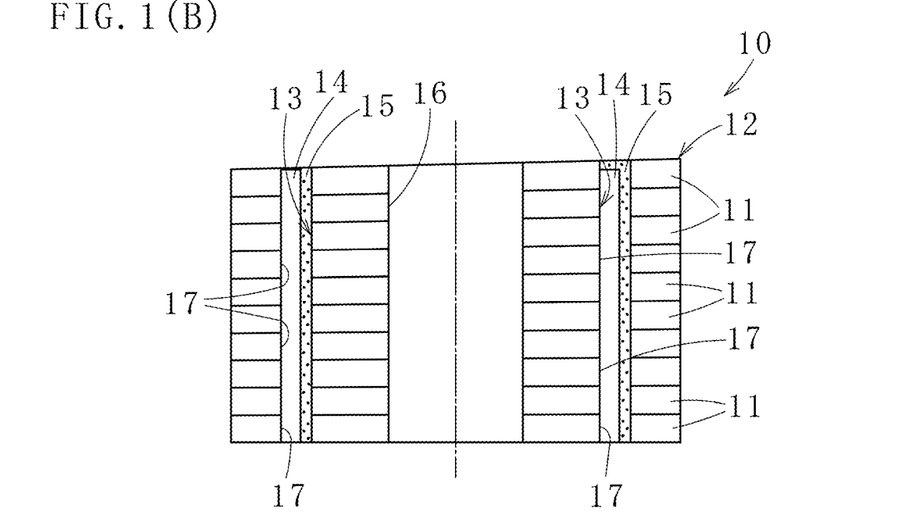

As illustrated in FIG. 1, a laminated rotor core (a rotor) 10 according to one embodiment of the present invention includes a laminated core body 12 formed by laminating a plurality of iron core pieces 11, is formed by inserting and sealing (fixing) with resin 15 permanent magnets 14 in a plurality of magnet insertion holes 13 formed in a circumferential direction centering on a shaft center of this laminated core body 12, and is capable of obtaining a good motor characteristic. As the resin 15, a thermosetting resin (e.g., epoxy resin) can be used, however, a thermoplastic resin can be used as well.

Detailed Descriptions will be Given Hereunder.

The laminated core body 12 is formed by sequentially laminating annular iron core pieces 11. One of the layers consisting of one of the annular iron core pieces 11 and composing the laminated core body 12 has an integral structure not provided with joining sections in a circumferential direction, however, the one of the annular iron core pieces 11 can alternatively have a block structure in which arc-like iron core piece segments can be circularly connected.

These iron core pieces 11 adjacent to one another in a lamination direction are, for example, joined together by the use of caulking or welding, however, the iron core pieces 11 can also be joined by filling resin into joining sections (e.g., through-holes) formed in the lamination direction of the laminated rotor core 10, and they can be joined together by means of a combination of two or more of these as well. Here, in the case of using resin for the joining, there will be no interlaminar short circuit at each joining section, which enhances magnetic property of a laminated rotor core. By using magnet insertion holes as joining sections, it is also possible to fill resin not only for the fixing of permanent magnets, but also for the joining of laminated iron core pieces.

At the center of the laminated core body 12, a shaft hole 16 is formed, and the plurality of (here, the number is four) magnet insertion holes 13 consisting of a plurality of through-holes 17 communicated with one another in the lamination direction are formed centering on and around the shaft hole 16. The through-holes 17 are formed in each of the plurality of the iron core pieces 11 to be laminated, and by laminating each of these iron core pieces 11, the magnet insertion holes 13 become formed.

Here, a non-illustrated key (having a protruded shape) projecting inward is provided to the shaft hole 16 so as to be capable of localizing positions (i.e., angles) of the magnet insertion holes 13 formed in the laminated core body 12.

Each of the magnet insertion holes 13 (through-holes 17) is formed in a nearly rectangular shape in planar view, and medial surfaces located on both sides in a circumferential direction (width direction) of each of the magnet insertion holes 13 are V-shaped.

The shape of each of the magnet insertion holes is not limited to the V-shape, and depending on the intended use, the shape can be changed variously. For example, each of the magnet insertion holes can be rectangular in planar view, and one or both of the medial surfaces each located on both sides in a radial direction of each of the magnet insertion holes, one or both of the medial surfaces each located on both sides in a circumferential direction of each of the magnet insertion holes, and even one or both of the medial surfaces each located on both sides in a circumferential and a radial direction can also be curved (arc-shaped).

Additionally, the number of the magnet insertion holes can be variously changed as well depending on the intended use.

Since the above laminated core body 12 is formed by rotationally laminating each of the iron core pieces 11, the deviation of lamination thickness in the circumferential direction of the laminated core body 12 is alleviated. However, since it is impossible to completely remove the deviation of lamination thickness, weight balance is disproportionate (see FIG. 6(B)).

For this reason, in the case of the laminated rotor core 10, in order to cancel out the imbalanced weight in the circumferential direction of the laminated core body 12 estimated from the deviation of lamination thickness, (A) insertion of the permanent magnets 14 into each of the magnet insertion holes 13, and/or (B) filling of resin 15 into each of the magnet insertion holes 13 are performed. Here, the imbalanced weight refers to a difference in weight in the circumferential direction of the laminated core body 12, and canceling out this imbalanced weight means removing the above difference in weight (preferably, to "0," however, for example, the difference in weight in the circumferential direction of the laminated rotor core 10 that is within the range of ±5% is acceptable).

The lamination thickness of the laminated core body 12 for calculating the deviation of lamination thickness can be obtained, for example, by virtually dividing the laminated core body 12 into a plurality in the circumferential direction, and measuring a lamination thickness in each of the divided areas using a measurement hardware such as a dial gauge and a laser range finder. A method for this virtual division is not specifically limited. For example, depending on a size of a laminated core body, the laminated core body can be divided into two to eight equal parts, or the laminated core body can be equally divided in a manner that makes each divided part contain one or a plurality of magnet insertion holes.

The imbalanced weight can be estimated, for example, from measured values of the above lamination thickness (these enable the calculation of deviation of lamination thickness), a volume of each divided part (phase part) using these measured values, and a density of each iron core piece.

First, descriptions will be given on the above-described (A) insertion of permanent magnets into each of magnet insertion holes.

As a method for this, there are, for example, two methods described below, and one or both of the two methods can be applied.

(a) Selectively inserting permanent magnets of different weights into each of magnet insertion holes.

(b) Adjusting arrangement positions of permanent magnets inside each of magnet insertion holes.

In the above method (a), in the case of the laminated core body 12 having an imbalance, the permanent magnets 14 of heavy weights become inserted in the magnet insertion holes 13 in an area of a light weight, and/or the permanent magnets 14 of light weights become inserted in the magnet insertion holes 13 in an area of a heavy weight.

Permanent magnets can be preliminarily weighed and stored separately based on each weight (preliminarily set weight ranges), and the permanent magnets of required weights can be used selectively. As these permanent magnets, ones preliminarily processed so as to make each weight different can be used, and ones resulted in having different weights can also be used.

A plurality of permanent magnets to be weighed can also be prepared in the number used for the manufacturing of a single laminated rotor core without preliminarily preparing (storing) many permanent magnets.

In this case, for example, based on each obtained imbalanced weight, each of the magnet insertion holes becomes numbered in ascending (or descending) order according to weight, and the above permanent magnets become allocated to each magnet insertion hole in descending (or ascending) order according to weight.

This enables, for example, ridding of stocks and storage of permanent magnets.

In the above method (b), in the case of the laminated core body 12 having an imbalance, with respect to the magnet insertion holes 13 in an area of a light weight, the permanent magnets 14 become arranged on the outer side in the radial direction (leaning outward), and/or with respect to the magnet insertion holes 13 in an area of a heavy weight, the permanent magnets 14 become arranged on the inner side in the radial direction (leaning inward). The permanent magnets are arranged in the central part in the circumferential direction inside each of the magnet insertion holes, however, the permanent magnets can be arranged leaning to one side or to the other side in the circumferential direction inside the magnet insertion holes as needed.

As just described, an imbalanced weight can be corrected by adjusting the arrangement positions of the permanent magnets 14, which makes the correction work simple.

Figure 2:
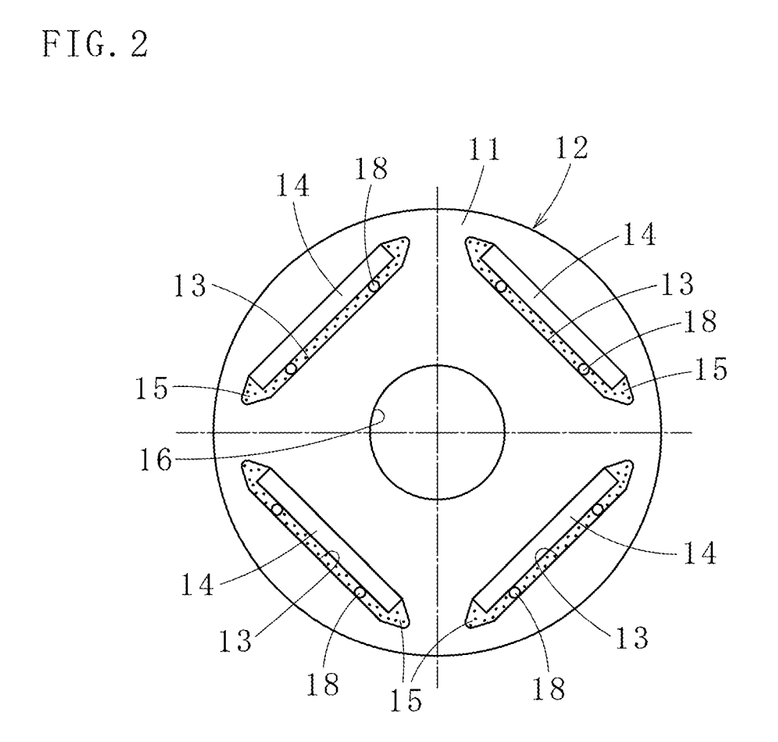
FIG. 2 is a plan view of a laminated rotor core according to a first variation.

Such the adjustment of arrangement positions of permanent magnets can be performed by adjusting positions of insertion of permanent magnets into magnet insertion holes. However, for example, as illustrated in FIG. 2, the adjustment can also be performed by preliminarily attaching positioning members 18 to the side surfaces of the permanent magnets 14, and inserting these permanent magnets 14 in the magnet insertion holes 13 together with the positioning members 18. The permanent magnets 14 can be positioned not only on the inner side or the outer side in the radial direction of the magnet insertion holes, but also on one side or on the other side in the circumferential direction by variously changing the positions on the permanent magnets 14 where the positioning members 18 become attached. This controls and further prevents the irregularity of fixed positions and postures of the permanent magnets 14 even at the time of injecting resin (resin in a molten state) 15 into the magnet insertion holes 13.

Next, descriptions will be given on the above-described (B) filling of resin into magnet insertion holes.

As a method for this, for example, there is a method of adjusting an amount of resin 15 to be filled (injected) into each of magnet insertion holes 13. That is, in the laminated core body 12 having an imbalance, an amount of resin to be injected into the magnet insertion holes 13 in an area of a light weight is increased, and/or an amount of resin to be injected into the magnet insertion holes 13 in an area of a heavy weight is decreased.

Since the imbalanced weight can thereby be corrected by means of a weight of the resin 15 filled into the magnet insertion holes 13, there is no need for an additional step.

The adjustment of the amount of resin 15 to be filled can be performed by, for example, a method described below.

Figure 3A:
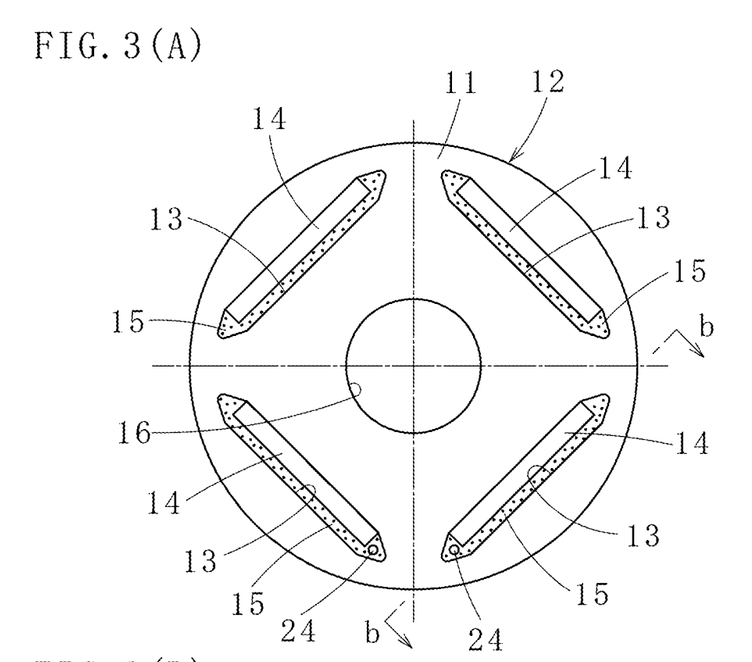
FIG. 3(A) is a plan view of a laminated rotor core according to a second variation.
Figure 3B:
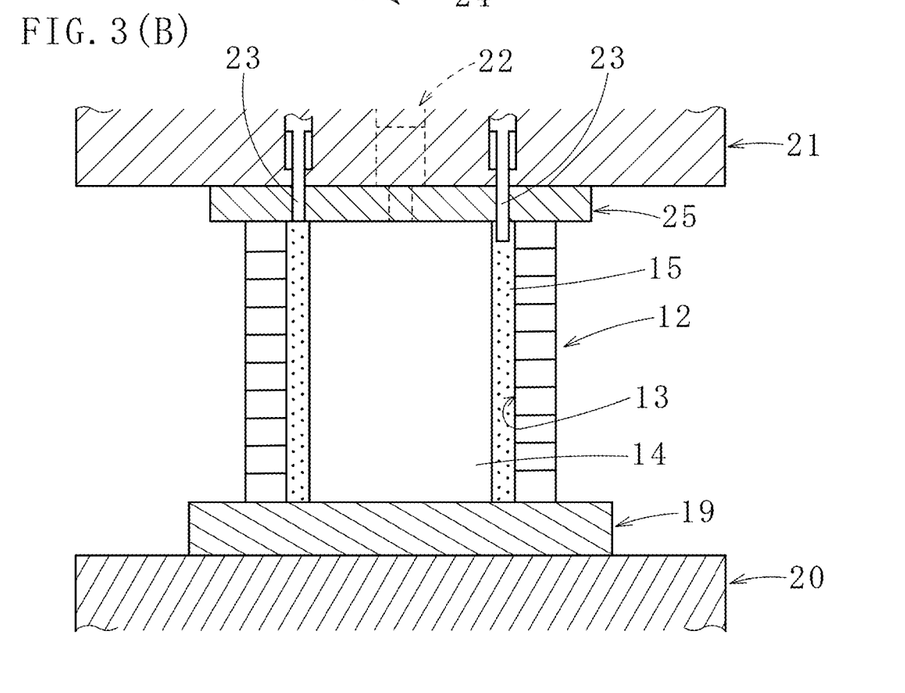
FIG. 3(B) is a cross-sectional view of FIG. 3(A) from an arrow b to another arrow b.

As illustrated in FIGS. 3(A) and 3(B), while the laminated core body 12 having the permanent magnets 14 inserted in each of the magnet insertion holes 13 is in the state of being placed on a conveyor jig 19, the laminated core body 12 becomes held in between and by a lower die 20 and an upper die 21. At the time of injecting resin 15 from resin reservoir pots 22 provided to the upper die 21 into each of the magnet insertion holes 13, tips of pins 23 provided to the upper die 21 in a manner that enables the pins 23 to move up and down become inserted inside the magnet insertion holes 13 (inside each gap between each medial surface of the magnet insertion holes 13 and each side surface of the permanent magnets 14), and an amount of depression of the pins 23 (an amount of insertion) is adjusted. A numeral 24 in FIG. 3(A) represents holes formed in the resin 15 by the pins 23, and a numeral 25 in FIG. 3(B) represents a cull plate.

Figure 4:
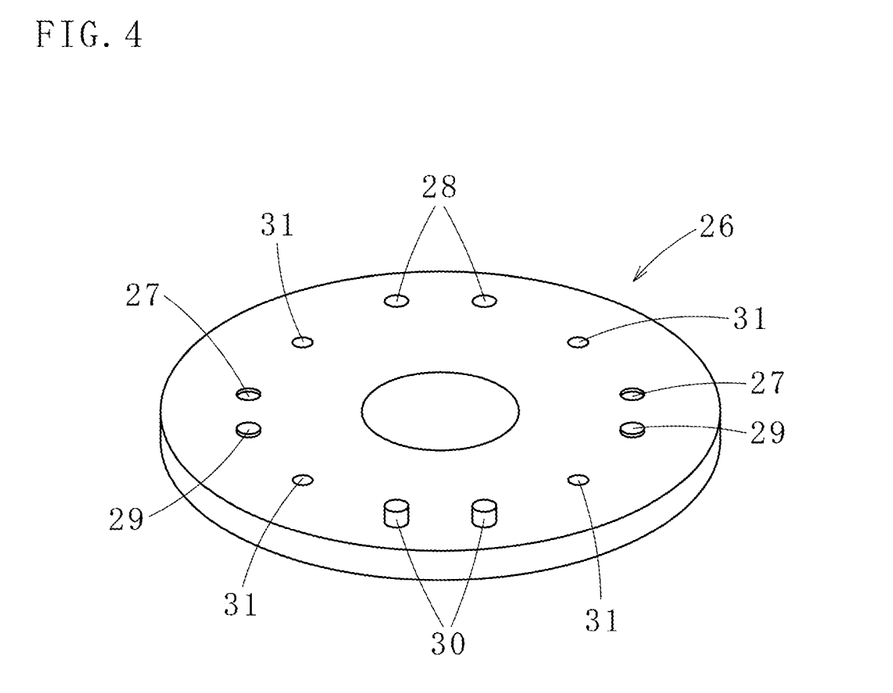
FIG. 4 is a perspective view of a cull plate for use in a method for manufacturing a laminated rotor core according to another embodiment of the present invention.

Also, in injecting the resin 15 into each of the magnet insertion holes 13, a cull plate 26 illustrated in FIG. 4 can be used as well.

In this cull plate 26, one each of two types of depressed parts (holes) 27 and 28 or one each of two types of protruded parts (protrusions) 29 and 30 are provided at positions corresponding to the magnet insertion holes (in a circumferential direction). The cull plate 26 is also provided with resin injection holes 31 (the same as resin injection holes 93 in FIG. 7), and the above each one of the depressed parts 27 and 28 or the above each one of the protruded parts 29 and 30 are arranged at positions on both sides of these resin injection holes 31. The positions on both sides of these resin injection holes 31 refer to positions of the gaps formed on both sides in a width direction (circumferential direction) of the permanent magnets inserted in the magnet insertion holes, and are positions where the permanent magnets inside the magnet insertion holes and the protruded parts 29, 30 do not interfere with one another. However, the depressed parts 27 and 28 do not necessarily have to be located at the positions on both sides of these resin injection holes 31 (the positions of the depressed parts 27 and 28 are not specifically limited).

Among the above two types of depressed parts 27 and 28, one of the depressed parts 27 each have a depth adjusted to be smaller than that of the other one of the depressed parts 28, and among the two types of protruded parts 29 and 30, one of the protruded parts 29 each have a height adjusted to be shorter than that of the other one of the protruded parts 30. The depressed parts 27 and 28 are provided in areas where an amount of resin to be injected into the magnet insertion holes is desired to be large, and the protruded parts 29 and 30 are provided in areas where an amount of resin to be injected into the magnet insertion holes is desired to be small.

When using the depressed parts 27 and 28 and the protruded parts 29 and 30, after placing the cull plate 26 on an upper surface of a laminated core body in a manner that makes each pair of one each of the depressed parts 27 and 28 and each pair of one each of the protruded parts 29 and 30 located at positions overlapping with each of the corresponding magnet insertion holes 13 in planar view, resin is injected into each of the magnet insertion holes through each of the resin injection holes 31.

The depth of each of the above depressed parts 27 and 28 is adjusted to be gradually smaller from the depressed parts 28 to the depressed parts 27, and the height of each of the protruded parts 29 and 30 is adjusted to be gradually shorter from the protruded parts 30 to the protruded parts 29. However, the depth of the depressed parts 27 and 28 and the height of the protruded parts 29 and 30 can also be random, and additionally, depressed parts and protruded parts do not have to be provided with respect to all magnet insertion holes.

As a cull plate, as stated above, the descriptions have been given on a case where both depressed parts and protruded parts are provided, however, only depressed parts or only protruded parts can be provided as well. Here, when providing only depressed parts, a depth of the depressed parts must be adjusted, and when providing only protruded parts, a height of the protruded parts must be adjusted. It is also possible to preliminarily prepare a plurality of kinds of cull plates provided with one or both of depressed parts and protruded parts.

Next, with reference to FIGS. 1(A) and 1(B), descriptions will be given on a method for manufacturing a laminated rotor core according to one embodiment of the present invention.

First, a plurality of iron core pieces 11 are punched out from an electromagnetic steel sheet of, for example, approximately 0.15 to 0.5 mm in thickness.

Then, by laminating the preliminarily set number of the iron core pieces 11, a laminated core body 12 becomes manufactured.

Here, for the lamination of the plurality of the iron core pieces 11, any one of the above-described caulking, welding and resin can be used, and two or more of these three can also be used in combination (the above is a lamination step).

Next, the laminated core body 12 is placed on a conveyor jig (e.g., see FIGS. 3(B) and 7). The laminated core body 12 thereby models on the conveyor jig (pillar), which corrects the shape of the laminated core body 12.

Then, as described earlier, by using a measurement hardware, a deviation of lamination thickness in a circumferential direction of the laminated core body 12 is measured, and an imbalanced weight in the circumferential direction of the laminated core body 12 becomes calculated (estimated) from this measured value.

It is preferred that the measuring of the deviation of lamination thickness be performed automatically by means of a measurement hardware, and the measured data be sent automatically to a computer. However, it is possible, for example, for a worker to perform the measurement and input the data into a computer. The imbalanced weight is calculated using the above measured value and by means of a computer in accordance with a preliminarily set program.

As just described, by measuring the deviation of lamination thickness and calculating (estimating) the imbalanced weight after placing the laminated core body 12 on the conveyor jig, a shift in the imbalanced weight in the laminated core body 12 can be ridded in the subsequent step of balance adjustment, and the correction of the imbalanced weight can be made unerringly.

However, when an amount of correction of a shape of a laminated core body is small, it is also possible to measure a deviation of lamination thickness in a circumferential direction of a laminated core body by the method described earlier before placing the laminated core body on a conveyor jig, and to calculate (estimate) an imbalanced weight in the circumferential direction of the laminated core body from this measured value (the above is a step of measuring a deviation of lamination thickness).

Next, while the laminated core body 12 is in the state of being placed on the conveyor jig, permanent magnets 14 are inserted in magnet insertion holes 13, and resin 15 is injected into the magnet insertion holes 13 and cured. These permanent magnets 14 each have a cross section that is smaller than that of each of the magnet insertion holes 13, and are unmagnetized. However, the permanent magnets 14 can also be those already magnetized.

Here, with regard to the insertion of the permanent magnets 14 into and the injection of resin 15 into the magnet insertion holes 13, (A) insertion of the permanent magnets 14 into each of the magnet insertion holes 13, and/or (B) filling of the resin 15 into each of the magnet insertion holes 13 are performed in a manner that cancels out the estimated imbalanced weight.

Specifically, provided that the above (A) is going to be performed, as illustrated in FIGS. 1(A), 1(B), and 2, the earlier-described method (a) and/or method (b) are performed.

Additionally, provided that the above (B) is going to be performed, as illustrated in FIGS. 3(A), 3(B), and 4, the earlier-described amount of resin 15 to be filled into each of the magnet insertion holes 13 is adjusted (the above is a step of balance adjustment).

After manufacturing the laminated rotor core 10 by means of the above methods, the conveyor jig is removed, and the laminated rotor core 10 is utilized.

The laminated rotor core 10 capable of effectively and economically obtaining a good motor characteristic can thereby be manufactured.

When using the laminated rotor core 10, the permanent magnets 14 are magnetized, and a shaft is inserted in the shaft hole 16 of the laminated rotor core 10.

The descriptions have been given hereinbefore on the present invention with reference to the embodiments. However, the present invention is not limited to the structures described in the above embodiments, and the present invention also includes other embodiments and variations conceivable within the scope of matters in the scope of claims. For example, a case where the laminated rotor core and the manufacturing method of the laminated rotor core according to the present invention are structured by combining part or all of each of the above-described embodiments and variations is also included in the scope of rights of the present invention.

In the earlier-described embodiments, the descriptions were given on the cases where magnet insertion holes are formed in a direction orthogonal to a radial direction of a laminated core body in planar view. However, magnet insertion holes are not limited to this formation, and for example, can also be formed in a direction crossing the radial direction of the laminated core body (e.g., inverted V shape in planar view). Additionally, in the above embodiments, the descriptions were given on the cases where a single permanent magnet is inserted in a single magnet insertion hole, however, it is also possible to insert a plurality of permanent magnets in a single magnet insertion hole.

REFERENCE SIGNS LIST

10: laminated rotor core, 11: iron core piece, 12: laminated core body, 13: magnet insertion hole, 14: permanent magnet, 15: resin, 16: shaft hole, 17: through-hole, 18: positioning member, 19: conveyor jig, 20: lower die, 21: upper die, 22: resin reservoir pot, 23: pin, 24: hole, 25, 26: cull plate, 27, 28: depressed part, 29, 30: protruded part, 31: resin injection hole

The invention claimed is:

1. A system for manufacturing a laminated rotor core, wherein the laminated rotor core has: a laminated core body formed by laminating a plurality of iron core pieces; and a plurality of magnet insertion holes having permanent magnets inserted inside and resin-sealed, the magnet insertion holes being formed in a circumferential direction centering on a shaft center of the laminated core body, the system comprising:

a cull plate being placed between an upper die and the laminated core body and covering all the magnet insertion holes, wherein the cull plate has resin injection holes and depressed parts or protruded parts, the depressed parts or the protruded parts being provided at positions different from the resin injection holes and at positions corresponding to all or some of the magnet insertion holes, the depressed parts or the protruded parts being configured to adjust an amount of resin to be injected into the magnet insertion holes in a manner that cancels out an imbalance in weight in the circumferential direction of the laminated core body.

2. A laminated rotor core, comprising:
a laminated core body formed by laminating a plurality of iron core pieces; and
a plurality of magnet insertion holes having permanent magnets inserted inside and resin-sealed, the magnet insertion holes being formed in a circumferential direction centering on a shaft center of the laminated core body, the laminated rotor core, further comprising: and
arranging the permanent magnets on the inner side in the radial direction inside the magnet insertion holes in an area of a heavy weight to cancel out an imbalanced weight in the circumferential direction of the laminated core body that is estimated from a deviation of lamination thickness in the circumferential direction of the laminated core body.

3. The laminated rotor core according to claim 2, wherein positioning members are attached to the side surfaces on the inner side in the radial direction of the permanent magnets to be positioned on the outer side in the radial direction of the magnet insertion holes.

4. A method for manufacturing a laminated rotor core, comprising:
composing a laminated core body by laminating a plurality of iron core pieces;
inserting permanent magnets in a plurality of magnet insertion holes formed in a circumferential direction centering on a shaft center of the laminated core body and injecting resin into the magnet insertion holes; and
curing the resin having been filled into the magnet insertion holes, the method for manufacturing a laminated rotor core, further including:
a step of measuring a deviation of lamination thickness in which a deviation of lamination thickness in the circumferential direction of the laminated core body is measured and an imbalanced weight in the circumferential direction of the laminated core body is estimated from the measured value; and
a step of balance adjustment in which an amount of the resin to be filled into each of the magnet insertion holes is adjusted by placing between an upper die and the laminated core body a cull plate which covers all the magnet insertion holes, and has resin injection holes and depressed parts or protruded parts, the depressed parts or the protruded parts being provided at positions different from the resin injection holes and at positions corresponding to all or some of the magnet insertion holes in a manner that cancels out the imbalanced weight estimated.

5. The method for manufacturing a laminated rotor core according to claim 4, wherein an amount of resin to be filled into each of the magnet insertion holes is adjusted.

6. The method for manufacturing a laminated rotor core according to claim 4, wherein the measurement of the deviation of lamination thickness in the step of measuring a deviation of lamination thickness is performed after placing the laminated core body on a conveyor jig, and the permanent magnets are inserted in each of the magnet insertion holes and resin is injected and cured while the laminated core body is on the conveyor jig.

7. A method for manufacturing a laminated rotor core, comprising:
composing a laminated core body by laminating a plurality of iron core pieces;
inserting permanent magnets in a plurality of magnet insertion holes formed in a circumferential direction centering on a shaft center of the laminated core body and injecting resin into the magnet insertion holes; and
curing the resin having been filled into the magnet insertion holes, the method for manufacturing a laminated rotor core, further including:
a step of measuring a deviation of lamination thickness in which a deviation of lamination thickness in the circumferential direction of the laminated core body is measured and an imbalanced weight in the circumferential direction of the laminated core body is estimated from the measured value; and
a step of balance adjustment including arranging the permanent magnets inside the magnet insertion holes based on the estimated imbalanced weight, the permanent magnets being arranged on the outer side in the radial direction inside the magnet insertion holes in an area of a light weight in a manner that cancels the estimated imbalanced weight, and/or the permanent magnets being arranged on the inner side in the radial direction inside the magnet insertion holes in an area of a heavy weight in a manner that cancels out the estimated imbalanced weight.

8. The method for manufacturing a laminated rotor core according to claim 7, wherein the measurement of the deviation of lamination thickness in the step of measuring a deviation of lamination thickness is performed after placing the laminated core body on a conveyor jig, and the permanent magnets are inserted in each of the magnet insertion holes and resin is injected and cured while the laminated core body is on the conveyor jig.

9. The laminated rotor core according to claim 7, wherein positioning members are attached to the side surfaces on the inner side in the radial direction of the permanent magnets to be positioned on the outer side in the radial direction of the magnet insertion holes, or the positioning members are attached to the side surfaces on the outer side in the radial direction of the permanent magnets to be positioned on the inner side in the radial direction of the magnet insertion holes.

* * * * *